(12) United States Patent
Hwang et al.

(10) Patent No.: US 8,885,323 B2
(45) Date of Patent: Nov. 11, 2014

(54) MULTILAYERED CERAMIC ELECTRONIC COMPONENT AND FABRICATING METHOD THEREOF

(71) Applicant: Samsung Electro-Mechanics, Co., Ltd., Gyunggi-do (KR)

(72) Inventors: Seok Joon Hwang, Gyunggi-do (KR); Je Jung Kim, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 99 days.

(21) Appl. No.: 13/671,095

(22) Filed: Nov. 7, 2012

(65) Prior Publication Data

US 2014/0043720 A1 Feb. 13, 2014

(30) Foreign Application Priority Data

Aug. 7, 2012 (KR) .................. 10-2012-0086210

(51) Int. Cl.
| | |
|---|---|
| *H01G 4/06* | (2006.01) |
| *H01G 4/005* | (2006.01) |
| *H01G 4/12* | (2006.01) |
| *H01G 4/30* | (2006.01) |

(52) U.S. Cl.
CPC ............... *H01G 4/12* (2013.01); *H01G 4/005* (2013.01); *H01G 4/30* (2013.01)
USPC ............. 361/321.2; 361/301.2; 361/301.4; 361/306.1; 361/306.3; 361/321.1

(58) Field of Classification Search
USPC .......... 361/321.2, 301.2, 301.4, 306.1, 306.3, 361/303–305, 311–313, 321.1
See application file for complete search history.

(56) References Cited

U.S. PATENT DOCUMENTS

| | | | | |
|---|---|---|---|---|
| 8,102,639 | B2 * | 1/2012 | Kasuya et al. ............... | 361/305 |
| 8,334,748 | B2 * | 12/2012 | Takeuchi et al. ............ | 336/200 |
| 8,456,799 | B2 * | 6/2013 | Chang et al. ............... | 361/321.2 |
| 8,570,710 | B2 * | 10/2013 | Kim et al. ................... | 361/321.2 |
| 8,587,920 | B2 * | 11/2013 | Lee et al. .................... | 361/301.4 |
| 8,630,081 | B2 * | 1/2014 | Yoshida ....................... | 361/303 |
| 2007/0251066 | A1 | 11/2007 | Kim et al. | |
| 2012/0134068 | A1 | 5/2012 | Chae et al. | |

FOREIGN PATENT DOCUMENTS

| | | |
|---|---|---|
| KR | 10-0587006 B1 | 5/2006 |
| KR | 10-2012-0058128 A | 6/2012 |

\* cited by examiner

*Primary Examiner* — Nguyen T Ha

(57) ABSTRACT

There is provided a multilayered ceramic electronic component including: a multilayered body in which a plurality of dielectric layers are stacked; a plurality of first and second internal electrodes formed on the dielectric layers so as to be alternately exposed through end surfaces; a minimum margin indicating part formed on an L-direction margin part on which the first or second internal electrode is not formed on the dielectric layer and indicating a minimum size of the L-direction margin part, the L-direction minimum margin indicating part being inserted on the ceramic sheet, whereby a multilayered ceramic electronic component having high capacitance while reducing a defect and having excellent reliability may be implemented.

14 Claims, 6 Drawing Sheets

MULTILAYERED CERAMIC ELECTRONIC COMPONENT AND FABRICATING METHOD THEREOF

CROSS-REFERENCE TO RELATED APPLICATIONS

This application claims the priority of Korean Patent Application No. 10-2012-0086210 filed on Aug. 7, 2012, in the Korean Intellectual Property Office, the disclosure of which is incorporated herein by reference.

BACKGROUND OF THE INVENTION

1. Field of the Invention

The present invention relates to a multilayered ceramic electronic component having high capacitance and excellent reliability and a fabricating method thereof, and more particularly, to a multilayered ceramic electronic component in which an L-direction margin of a cut chip is visible to the naked eye to thereby allow a defective chip to be easily detected.

2. Description of the Related Art

In accordance with the recent trend for the miniaturization of electronic products, demand for multilayered ceramic electronic components having a small size and high capacitance has increased.

Therefore, a dielectric layer and an internal electrode have been thinned and stacked in increased numbers through various methods. Recently, as a thickness of the dielectric layer has been reduced, multilayered ceramic electronic components having an increased number of stacked layers have been fabricated.

In a structure of a multilayered ceramic capacitor (MLCC), a margin in an L-direction or a W direction serves to protect a multilayered part of the internal electrodes charging and discharging electric charges from electrical stress, moisture, a plating solution, or the like. Therefore, a relatively minimal margin needs to be secured to secure durability, and in the case in which the margin in the L-direction or the W-direction is insufficient, a defect may be caused.

In fabricating the MLCC according to the related art, since a green chip is cut and the margin thereof is confirmed in a W direction, a margin test is performed before cutting the cut chip to detect a defective chip, such that a minimal W margin may be secured, but in the case of the margin in the L-direction, since the margin thereof is present in an inner portion of the cut chip, the margin may not be confirmed.

Therefore, in fact, in an electrical load test under high-temperature or high-moisture conditions, the margin in the L-direction (a distance between internal electrodes connected to a first external electrode and a second external electrode having polarity opposite to that of the first external electrode) is extremely small as several um at the time of deterioration in insulation resistance (IR) or within a defective chip, thus resulting in a deterioration the IR. In order to reduce these defects, a relatively minimal margin in the L-direction may be secured.

RELATED ART DOCUMENT

Korean Patent Laid-Open Publication No. 2012-0058128

SUMMARY OF THE INVENTION

An aspect of the present invention provides a multilayered ceramic electronic component having high capacitance capable of having a reduced defect and excellent reliability.

According to an aspect of the present invention, there is provided a multilayered ceramic electronic component including: a multilayered body in which a plurality of dielectric layers are stacked; a plurality of first and second internal electrodes formed on the dielectric layers so as to be alternately exposed through end surfaces; a minimum margin indicating part formed on an L-direction margin part on which the first or second internal electrode is not formed on the dielectric layer and indicating a minimum size of the L-direction margin part.

A size of the minimum margin indicating part in an L-direction may be less than or equal to a size of the L-direction margin part.

A chip of the multilayered body may have a 1608-standard size (1.6 mm×0.8 mm×0.8 mm) or less.

The size of the minimum margin indicating part may be 10 um or greater.

The stacked dielectric layers may be provided in an amount of 100 to 1000.

A conductive metal may be at least one of silver (Ag), lead (Pg), platinum (Pt), nickel (Ni), and copper (Cu).

The ceramic may be barium titanate ($BaTiO_3$).

According to another aspect of the present invention, there is provided a fabricating method of a multilayered ceramic electronic component, the fabricating method including: preparing a ceramic green sheet including a dielectric layer; forming internal electrode patterns on the ceramic green sheet by using conductive paste for an internal electrode including conductive metal powder particles and ceramic powder particles; and stacking and sintering the green sheet having the internal electrode patterns formed thereon to form a ceramic body including a plurality of internal electrodes disposed to face each other, having the dielectric layer interposed therebetween, wherein the plurality of internal electrode patterns are formed by inserting a minimum margin indicating part indicating a minimum size of an L-direction margin part into the internal electrode patterns to thus stack and sinter the green sheets.

A size of the minimum margin indicating part in an L-direction may be less than or equal to a size of the L-direction margin part.

A chip of the multilayered body may have a 1608-standard size (1.6 mm×0.8 mm×0.8 mm) or less.

The size of the minimum margin indicating part may be 10 um or greater.

The stacked dielectric layers may be provided in an amount of 100 to 1000.

The conductive metal may be at least one of silver (Ag), lead (Pg), platinum (Pt), nickel (Ni), and copper (Cu).

The ceramic may be barium titanate ($BaTiO_3$).

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
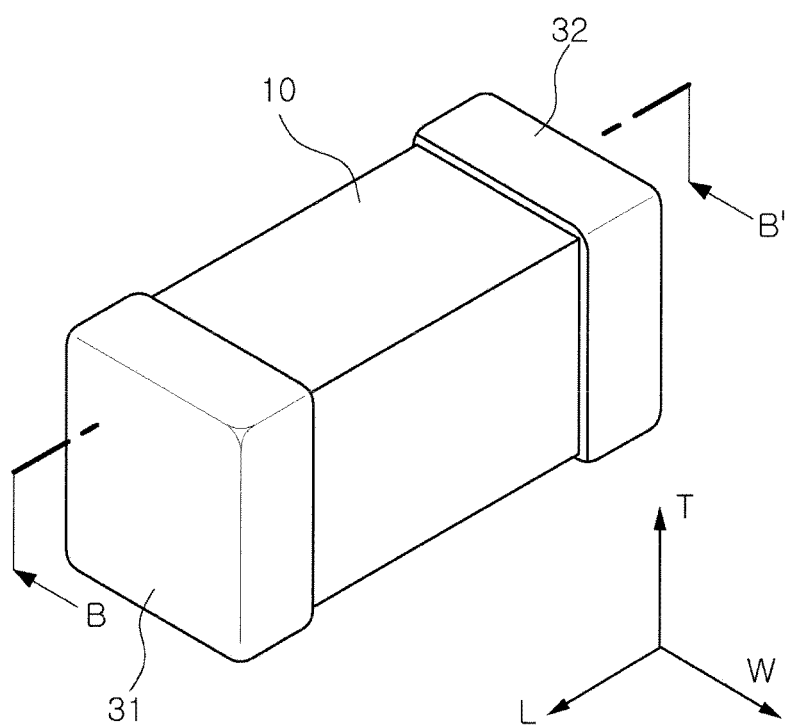
FIG. 1 is a perspective view schematically showing a multilayered ceramic capacitor according to an embodiment of the present invention.

Embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. Therefore, in the drawings, the shapes and dimensions may be exaggerated for clarity, and the same reference numerals will be used throughout to designate the same or like components.

Embodiments of the present invention will now be described in detail with reference to the accompanying drawings.

FIG. 1 is a perspective view schematically showing a laminated ceramic capacitor according to an embodiment of the present invention.

Figure 2:
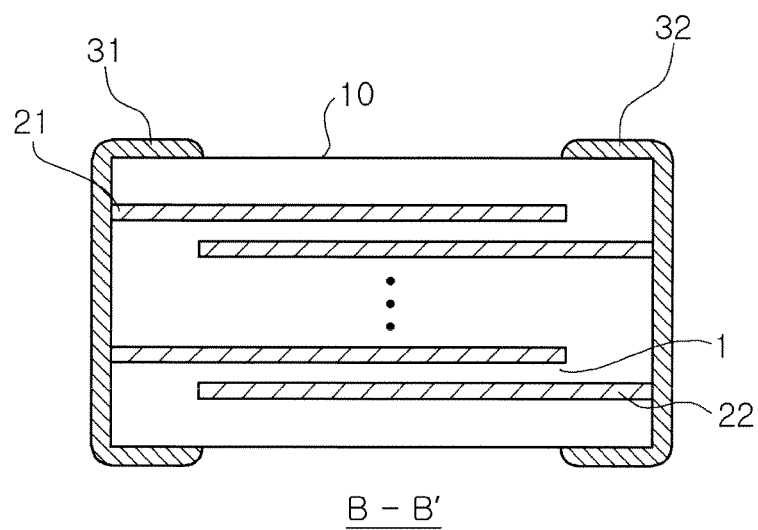
FIG. 2 is a cross-sectional view taken along line B-B' of FIG. 1.

FIG. 2 is a cross-sectional view taken along line B-B' of FIG. 1.

Figure 3:
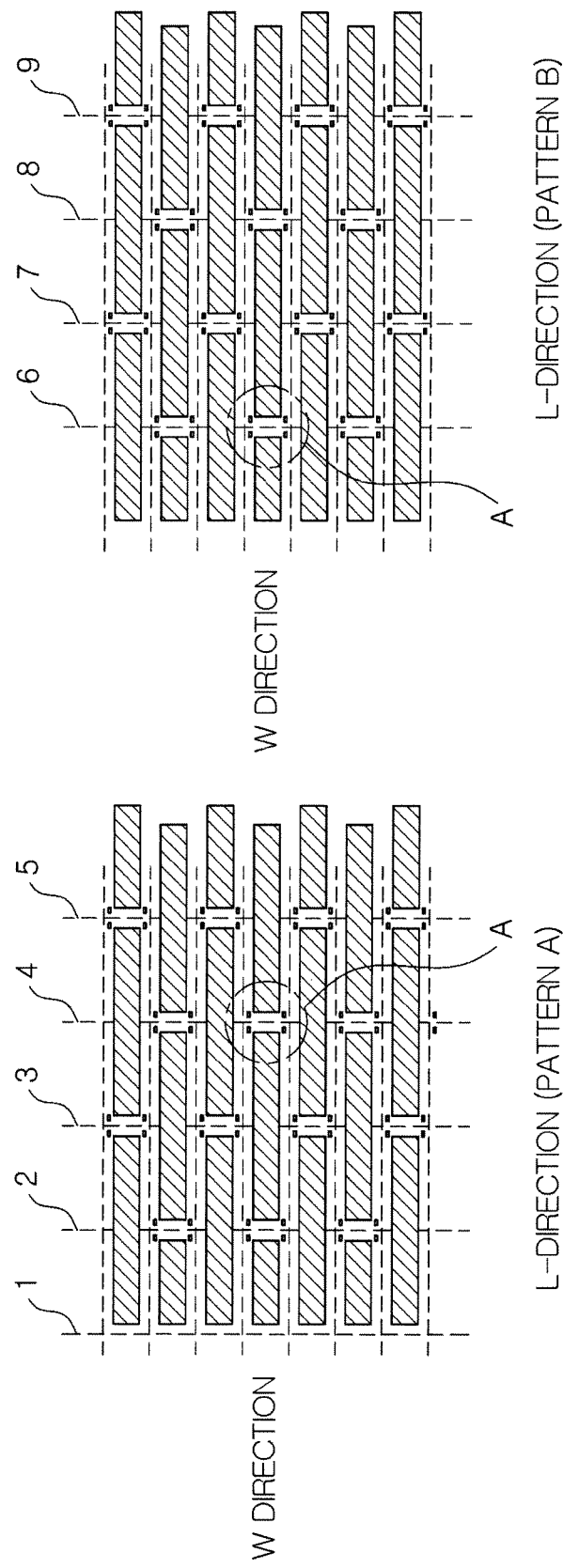
FIG. 3 is a partially enlarged view schematically showing a cross-section showing an L-direction margin inspection indication according to the embodiment of the present invention.

FIG. 3 is a partially enlarged view schematically showing a cross-section showing an L-direction margin inspection indication according to the embodiment of the present invention.

Figure 4:
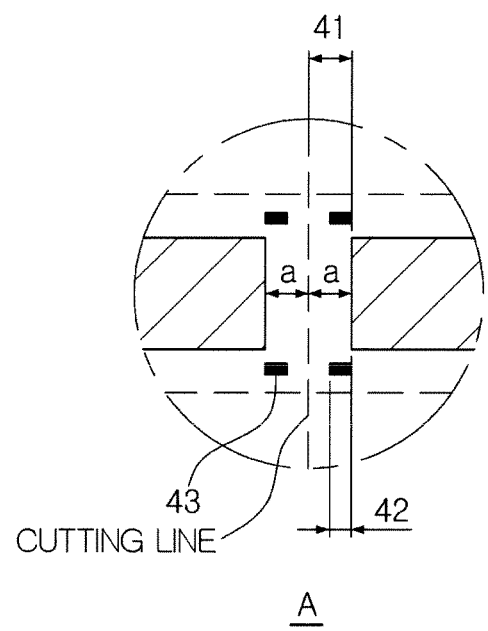
FIG. 4 is an enlarged view schematically showing part A of FIG. 3.

FIG. 4 is an enlarged view schematically showing part A of FIG. 3.

Figure 5:
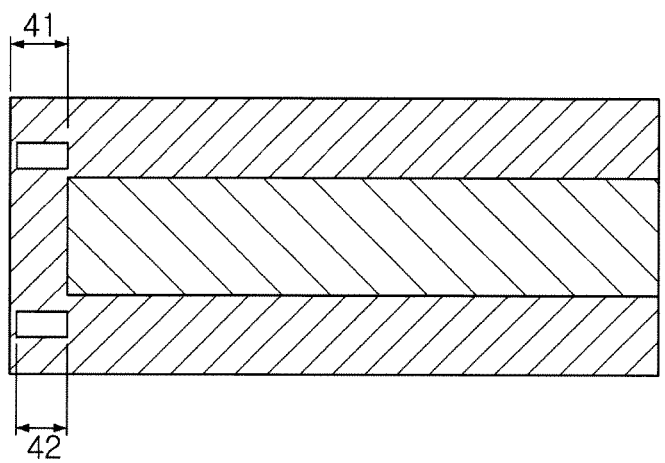
FIG. 5 is a cross-sectional view showing a chip cut in the L-direction of which a size of an L margin is the L minimum margin (a) or greater according to the embodiment of the present invention.

FIG. 5 is a cross-sectional view showing a chip cut in the L-direction of which a size of an L margin is equal to the L minimum margin (a) or greater, according to the embodiment of the present invention.

Figure 6:
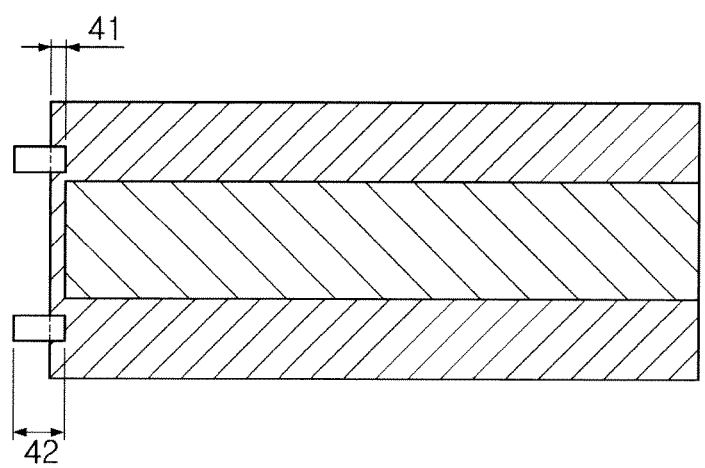
FIG. 6 is a cross-sectional view showing the chip cut in the L-direction of which the size of the L margin is less than the L minimum margin (a) according to the embodiment of the present invention.

FIG. 6 is a cross-sectional view showing the chip cut in the L-direction of which a size of the L margin is less than the L minimum margin (a) according to the embodiment of the present invention.

Figure 7:
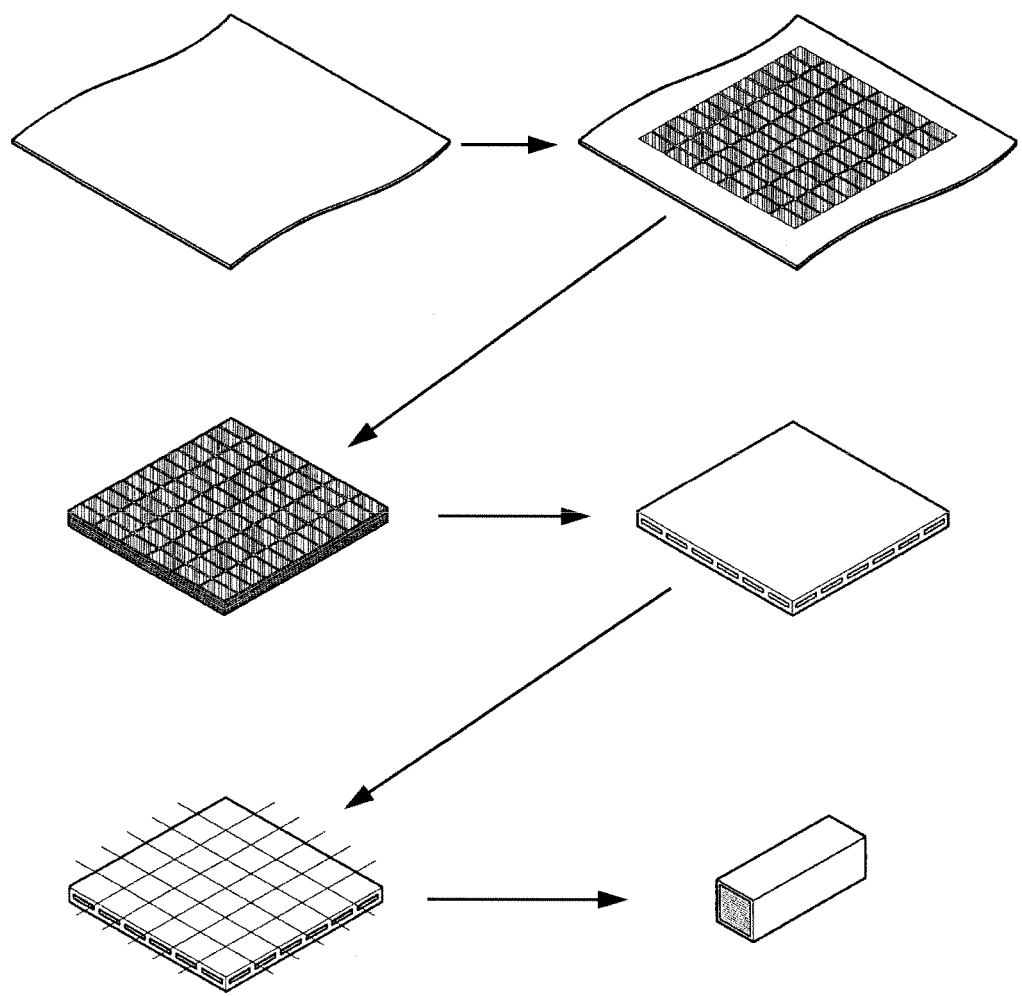
FIG. 7 is a view showing a process for fabricating a multilayered ceramic capacitor according to another embodiment of the present invention.

FIG. 7 is a view showing a process for fabricating a multilayered ceramic capacitor according to another embodiment of the present invention.

Referring to FIGS. 1 through 6, a multilayered ceramic electronic component according to the embodiment of the present invention may include: a ceramic body 10 including a dielectric layer 1; a plurality of internal electrodes 21 and 22 disposed to face each other, having the dielectric layer 1 therebetween in the ceramic body 10; and external electrodes 31 and 32 electrically connected to the plurality of internal electrodes 21 and 22.

Hereinafter, the multilayered ceramic electronic component according to the embodiment of the present invention will be described. In particular, a multilayered ceramic capacitor will be described. However, the present invention is not limited thereto.

In the multilayered ceramic capacitor according to the embodiment of the present invention, a 'length direction' refers to an 'L' direction of FIG. 1, a 'width direction' refers to a 'W' direction of FIG. 1, and a 'thickness direction' refers to a "T" direction of FIG. 1. Here, the 'thickness direction' is the same as a direction in which dielectric layers are stacked, that is, a 'stacking direction'.

According to the embodiment of the present invention, a raw material forming the dielectric layer 1 is not particularly limited as long as sufficient capacitance may be obtained, but may be, for example, a barium titanate ($BaTiO_3$) powder.

In a material forming the dielectric layer 1, various ceramic additives, organic solvents, plasticizers, binders, dispersing agents, and the like, may be applied to a powder such as a barium titanate ($BaTiO_3$) powder, or the like, according to the purpose of the present invention.

An average particle of the ceramic powder used in forming of the dielectric layer 1 is not particularly limited. The average particle thereof may be controlled to be, for example, 400 nm or less, according to the embodiment of the present invention.

A material forming the plurality of internal electrodes 21 and 22 is not specifically limited, but may be a conductive paste formed of at least one material selected from silver (Ag), lead (Pg), platinum (Pt), nickel (Ni), and copper (Cu).

In addition, the plurality of internal electrodes 21 and 22 may include the ceramic, and the ceramic is not specifically limited, but may be barium titanate ($BaTiO_3$).

In order to form capacitance, the external electrodes 31 and 32 may be formed on outer surfaces of the ceramic body 10, and electrically connected to the plurality of internal electrodes 21 and 22.

The external electrodes 31 and 32 may be formed of the same conductive materials as the internal electrode, but are not limited thereto. For example, the external electrodes 31 and 32 may be formed of copper (Cu), silver (Ag), nickel (Ni), or the like.

The external electrodes 31 and 32 may be formed by applying a conductive paste prepared by adding glass frit to the metal powder and firing the conductive paste.

Referring to FIGS. 3 through 6, in the related art, the internal electrodes are configured on the green sheet like FIG. 3, such that sixth, seventh, eighth, and ninth positions of pattern B are disposed in first, second, third, and fourth positions of pattern A, and the first, second, third, and fourth positions of pattern A are re-disposed in the sixth, seventh, eighth, and ninth positions of pattern B, and then the above-described process is repeated to stack and compress the green sheets. Then, in the case of cutting the green sheets at a position of a dotted line, since the internal electrode in the L-direction is present in an inner portion of the chip, the L margin is not visible.

However, in the Inventive Examples of the present invention, the L-direction margin inspection indicating part 43 is inserted into a printed pattern according to the related art, and then the green sheets are stacked, compressed and cut. In the case of a regular cut chip in which an L margin 41 in the cut chip is L-direction minimum margin (a) (42) or greater, the L-direction margin inspection indicating part 43 is not visible on the L-direction margin part as shown in FIG. 5. However, in the case in which the L margin 41 in the cut chip is less than the L-direction minimum margin (a) 42, the L-direction margin inspection indicating part 43 is visible on the L-direction margin part as shown in FIG. 6, such that an inspection may be performed in the cut chip.

That is, in the case in which the L-direction margin inspection indicating part 43 is not visible to the naked eye on the L-direction margin part of the cut chip, the multilayered ceramic electronic component is determined not to be defective, but in the case in which the L-margin inspection indicating part 43 is visible to the naked eye on the cut chip L-direction margin part, the multilayered ceramic electronic component is determined to be defective, such that a defective chip may be easily detected.

FIG. 7 is a view showing a process for fabricating a multilayered ceramic capacitor according to another embodiment of the present invention.

Referring to FIG. 7, a fabricating method of a multilayered ceramic electronic component according to another embodiment of the present invention may include: preparing a ceramic green sheet including a dielectric layer; forming internal electrode patterns on the ceramic green sheet by using conductive paste for an internal electrode including conductive metal powder particles and ceramic powder particles; and stacking and sintering the green sheets having the internal electrode patterns formed thereon to form a ceramic body including a plurality of internal electrodes disposed to face each other, having the dielectric layer interposed therebetween, wherein at the time of forming the plurality of internal electrode patterns, a minimum margin indicating part indicating a minimum size of an L-direction margin part is inserted into the internal electrode patterns and the green sheets are stacked and sintered.

The fabricating method of the multilayered ceramic electronic component according to another embodiment of the present invention may first include preparing the ceramic green sheet including the dielectric layer.

Ceramic powder particles, a binder and a solvent may be mixed to prepare a slurry, and the thusly obtained slurry may be fabricated as a sheet having a thickness of several um by a doctor blade method.

Then, the conductive paste for the internal electrode including the conductive metal powder particles and the ceramic powder particles may be used to form internal electrode patterns on the ceramic green sheet.

Then, the green sheets having the internal electrode pattern formed thereon are stacked and sintered, such that a ceramic body including the plurality of internal electrodes disposed to face each other, having the dielectric layer interposed therebetween may be formed.

At the time of forming the plurality of internal electrode patterns, the minimum margin indicating part indicating the minimum size of the L-direction margin part is inserted into the internal electrode patterns and the green sheets are stacked and sintered. A size of the minimum margin indicating part in an L-direction may be less than or equal to that of the L-direction margin part.

The conductive metal may be at least one of silver (Ag), lead (Pg), platinum (Pt), nickel (Ni), and copper (Cu).

In addition, the ceramic may be barium titanate ($BaTiO_3$).

Descriptions which are the same as the characteristics of the stacked ceramic electronic components according to the embodiment of the present invention will be omitted.

Hereafter, although the present invention will be described in detail with reference to Inventive Examples thereof, it is not limited thereto.

In the Inventive Examples, variously sized L-direction minimum margin indicating parts were inserted into the chips, into which the L-direction margin inspection indicating part was not previously inserted, fabricated according to the related art, and then the chips showing the L-direction margin inspection indicating parts on a W surface at the time of cutting were selected. Next, the minimum L margin for each chip size was tested under conditions of 85° C., 85 RH (%), and 50V.

The multilayered ceramic capacitor according to the present embodiment was fabricated as follows.

First, a slurry containing a powder such as a barium titanate ($BaTiO_3$) powder having an average particle size of 0.1 um, or the like, was applied to a carrier film and dried thereon to prepare a plurality of ceramic green sheets, thereby forming a dielectric layer 1.

Then, a conductive paste for an internal electrode including conductive metal powder particles and ceramic powder particles was prepared.

The conductive paste for the internal electrode was applied on the green sheet by a screen printing method to thereby form an internal electrode and then stacked in 190 to 250 layers to thereby form a multilayered body.

Then, the multilayered body was compressed and cut to prepare chips having 1608-, 1005-, 0603-, and 0402-standard sizes. Results of load tests under high-temperature and high-humidity according to the chip sizes were shown in FIGS. 1 to 4.

The L-direction margin inspection indicating part was not inserted into a chip having a 1608-standard size (1.6 mm×0.8 mm×0.8 mm), 22 uF, fabricated according to the related art, to prepare sample A, and the L-direction margin inspection indicating parts were inserted into the chips to prepare samples B, C, D, and E so that each minimum margin in the L-direction is 10 um (sample B), 15 um (sample C), 20 um (sample D), and 25 um (sample E). Then, the chips showing the L-direction margin inspection indicating parts on a W surface at the time of cutting were selected. Then, plasticizing, sintering, cutting, and Ni/Sn plating processes were performed on samples A to E under the same conditions, and loading tests were performed on each of 400 samples under conditions of 85° C., 85 RH (%), and 50V for a total of 100 hrs. Results thereof are shown in table 1 below.

TABLE 1

| | 85° C., 85 RH (%), 50 Vdc | | | | |
|---|---|---|---|---|---|
| Sample | 2 hrs | 24 hrs | 48 hrs | 72 hrs | 100 hrs |
| Sample A | 1/400 | 3/400 | 7/400 | 10/400 | 10/400 |
| Sample B | 0/400 | 0/400 | 0/400 | 2/400 | 2/400 |
| Sample C | 0/400 | 0/400 | 0/400 | 0/400 | 0/400 |
| Sample D | 0/400 | 0/400 | 0/400 | 0/400 | 0/400 |
| Sample E | 0/400 | 0/400 | 0/400 | 0/400 | 0/400 |

Referring to table 1 above, it could be appreciated that in sample C having the L-direction minimum margin of 15 um or greater, a defective sample was not generated, but in sample A produced according to the related art and the sample B having the minimum margin of 10 um, 10 IR defective chips out of 400, and 2 IR defective chips out of 400 were generated, respectively.

The L-direction margin inspection indicating part was not inserted into a chip having a 1005 standard size (1.0 mm×0.5 mm×0.5 mm), 10 uF, fabricated according to the related art, to prepare sample A, and the L-direction margin inspection indicating parts were inserted into the chips to prepare samples B, C, D, and E so that each minimum margin in the L-direction was 7 um (sample B), 10 um (sample C), 13 um (sample D), and 18 um (sample E), respectively. Then, the chips showing the L-direction margin inspection indicating parts on a W surface at the time of cutting were selected. Then, plasticizing, sintering, cutting, and Ni/Sn plating processes were performed on samples A to E under the same conditions, and loading tests were performed on each of 400 samples under conditions of 85° C., 85 RH (%), and 30V for a total of 100 hrs. Results thereof are shown in table 2 below.

TABLE 2

| | 85° C., 85 RH (%), 30 Vdc | | | | |
|---|---|---|---|---|---|
| Sample | 2 hr | 24 hr | 48 hr | 72 hr | 100 hr |
| Sample A | 0/400 | 2/400 | 4/400 | 7/400 | 9/400 |
| Sample B | 0/400 | 0/400 | 2/400 | 4/400 | 7/400 |
| Sample C | 0/400 | 0/400 | 0/400 | 1/400 | 1/400 |
| Sample D | 0/400 | 0/400 | 0/400 | 0/400 | 0/400 |
| Sample E | 0/400 | 0/400 | 0/400 | 0/400 | 0/400 |

Referring to table 2 above, it could be appreciated that in the sample D having the L-direction minimum margin of 13 um or greater, a defective sample was not generated, but in the sample A produced according to the related art, the sample B having the minimum margin of 7 um, and the sample C having the minimum margin of 10 um, 9 IR defective chips out of 400, 7 IR defective chips out of 400, 1 IR defective chip out of 400 were generated, respectively.

The L-direction margin inspection indicating part was not inserted into a chip having a 0603 standard size (0.6 mm×0.3 mm×0.3 mm), 2.2 uF, fabricated according to the related art, to prepare sample A, and the L-direction margin inspection indicating parts were inserted into the chips to prepare samples B, C, D, and E so that each minimum margin in the L-direction is 7 um (sample B), 10 um (sample C), 13 um (sample D), and 15 um (sample E). Then, the chips showing the L-direction margin inspection indicating parts on a W surface at the time of cutting were selected. Then, plasticizing, sintering, cutting, and Ni/Sn plating processes were performed on the samples A to E under the same conditions, and loading tests were performed on each of 400 samples under conditions of 85° C., 85 RH (%), and 20V for a total of 100 hrs. Results thereof are shown in table 3 below.

TABLE 3

| | 85° C, 85 RH (%), 20 Vdc | | | | |
|---|---|---|---|---|---|
| Sample | 2 hr | 24 hr | 48 hr | 72 hr | 100 hr |
| Sample A | 0/400 | 1/400 | 3/400 | 3/400 | 5/400 |
| Sample B | 0/400 | 0/400 | 0/400 | 2/400 | 4/400 |
| Sample C | 0/400 | 0/400 | 0/400 | 0/400 | 0/400 |
| Sample D | 0/400 | 0/400 | 0/400 | 0/400 | 0/400 |
| Sample E | 0/400 | 0/400 | 0/400 | 0/400 | 0/400 |

Referring to table 3 above, it could be appreciated that in sample C having the L-direction minimum margin of 10 um or greater, a defective sample was not generated, but in sample A, produced according to the related art and sample B, having the minimum margin of 7 um, 5 IR defective chips out of 400, and 4 IR defective chips out of 400 were generated, respectively.

The L-direction margin inspection indicating part was not inserted into a chip having a 0402 standard size (0.4 mm×0.2 mm×0.2 mm), 0.22 uF, fabricated according to the related art, to prepare sample A, and the L-direction margin inspection indicating parts were inserted into the chips to prepare samples B, C, D, and E so that each minimum margin in the L-direction is 5 um (sample B), 7 um (sample C), 10 um (sample D), and 13 um (sample E). Then, the chips showing the L-direction margin inspection indicating parts on a W surface at the time of cutting were selected. Then, plasticizing, sintering, cutting, and Ni/Sn plating processes were performed on the samples A to E under the same conditions, and loading tests were performed on each of 400 samples under conditions of 85° C., 85 RH (%), and 20V for a total of 100 hrs. Results thereof are shown in table 4 below.

TABLE 4

| | 85° C., 85 RH (%), 20 Vdc | | | | |
|---|---|---|---|---|---|
| Sample | 2 hr | 24 hr | 48 hr | 72 hr | 100 hr |
| Sample A | 2/400 | 4/400 | 7/400 | 8/400 | 11/400 |
| Sample B | 0/400 | 0/400 | 4/400 | 6/400 | 7/400 |
| Sample C | 0/400 | 0/400 | 0/400 | 0/400 | 0/400 |
| Sample D | 0/400 | 0/400 | 0/400 | 0/400 | 0/400 |
| Sample E | 0/400 | 0/400 | 0/400 | 0/400 | 0/400 |

Referring to table 4 above, it could be appreciated that in sample D having the L-direction minimum margin of 10 um or greater, a defective sample was not generated, but in sample A, produced according to the related art and sample B, having the minimum margin of 5 um, 11 IR defective chips out of 400, and 7 IR defective chips out of 400 were generated, respectively.

Through the above-Examples, the L-direction margin minimum size for each chip size capable of largely reducing accelerated lifespan failure rate due to insufficiency of the L-direction margin may be appreciated, and results thereof were shown in table 5 below.

TABLE 5

| Chip Size (mm) | Capacitance | Minimum L Margin |
|---|---|---|
| 1608 | 22 uF | 15 um or greater |
| 1005 | 10 uF | 13 um or greater |
| 0603 | 2.2 uF | 10 um or greater |
| 0402 | 0.22 uF | 10 um or greater |

Referring to table 5 above, it could be appreciated that in the chip having the 1608-standard size, the accelerated lifespan failure rate may be largely reduced in the case in which the minimum margin in the L-direction is 15 um or greater, and in the chip having the 1005 standard size, the accelerated lifespan failure rate may be largely reduced in the case in which the minimum margin in the L-direction is 13 um or greater.

As set forth above, according to the embodiments of the present invention, the L-direction minimum margin indicating part is inserted on the ceramic sheet, whereby the multilayered ceramic electronic component having the high capacitance, in which defects are reduced and the reliability thereof is excellent, may be implemented.

While the present invention has been shown and described in connection with the embodiments thereof, it will be apparent to those skilled in the art that modifications and variations can be made without departing from the spirit and scope of the invention as defined by the appended claims.

What is claimed is:

1. A multilayered ceramic electronic component comprising:
   a multilayered body including a plurality of dielectric layers stacked therein;
   a plurality of first and second internal electrodes formed on the dielectric layers so as to be alternately exposed through end surfaces;
   a minimum margin indicating part formed on an L-direction margin part on which the first or second internal electrode is not formed on the dielectric layer and indicating a minimum size of the L-direction margin part.

2. The multilayered ceramic electronic component of claim 1, wherein a size of the minimum margin indicating part in an L-direction is less than or equal to a size of the L-direction margin part.

3. The multilayered ceramic electronic component of claim 1, wherein a chip of the multilayered body has a 1608-standard size (1.6 mm×0.8 mm×0.8 mm) or less.

4. The multilayered ceramic electronic component of claim 1, wherein the size of the minimum margin indicating part is 10 um or greater.

5. The multilayered ceramic electronic component of claim 1, wherein the stacked dielectric layers are provided in an amount of 100 to 1000.

6. The multilayered ceramic electronic component of claim 1, wherein a conductive metal is at least one of silver (Ag), lead (Pg), platinum (Pt), nickel (Ni), and copper (Cu).

7. The multilayered ceramic electronic component of claim 1, wherein the ceramic is barium titanate ($BaTiO_3$).

8. A fabricating method of a multilayered ceramic electronic component, the fabricating method comprising:
    preparing a ceramic green sheet including a dielectric layer;
    forming internal electrode patterns on the ceramic green sheet by using conductive paste for an internal electrode including conductive metal powder particles and ceramic powder particles; and
    stacking and sintering the green sheets having the internal electrode patterns formed thereon to form a ceramic body including a plurality of internal electrodes disposed to face each other, having the dielectric layer interposed therebetween;
    the plurality of internal electrode patterns being formed by inserting a minimum margin indicating part indicating a minimum size of an L-direction margin part into the internal electrode patterns to thus stack and sinter the green sheets.

9. The fabricating method of claim 8, wherein a size of the minimum margin indicating part in an L-direction is less than or equal to a size of the L-direction margin part.

10. The fabricating method of claim 8, wherein a chip of the multilayered body has a 1608-standard size (1.6 mm×0.8 mm×0.8 mm) or less.

11. The fabricating method of claim 8, wherein the size of the minimum margin indicating part is 10 um or greater.

12. The fabricating method of claim 8, wherein the stacked dielectric layers are provided in an amount of 100 to 1000.

13. The fabricating method of claim 8, wherein the conductive metal is at least one of silver (Ag), lead (Pg), platinum (Pt), nickel (Ni), and copper (Cu).

14. The fabricating method of claim 8, wherein the ceramic is barium titanate ($BaTiO_3$).

* * * * *